United States Patent
Ladkani et al.

(10) Patent No.: US 11,144,487 B1
(45) Date of Patent: Oct. 12, 2021

(54) METHOD TO OVERLOAD HARDWARE PIN FOR IMPROVED SYSTEM MANAGEMENT

(71) Applicant: Microsoft Technology Licensing, LLC, Redmond, WA (US)

(72) Inventors: Neeraj Ladkani, Bothell, WA (US); Mallik Bulusu, Bellevue, WA (US); Sagar Dharia, Bellevue, WA (US); Muhammad Ashfaq Ahmed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/823,316

(22) Filed: Mar. 18, 2020

(51) Int. Cl.
| | |
|---|---|
| *G06F 9/4401* | (2018.01) |
| *G06F 11/30* | (2006.01) |
| *G06F 13/24* | (2006.01) |
| *G06F 9/54* | (2006.01) |
| *G06F 9/30* | (2018.01) |

(52) U.S. Cl.
CPC .......... *G06F 13/24* (2013.01); *G06F 9/30181* (2013.01); *G06F 9/4406* (2013.01); *G06F 9/542* (2013.01); *G06F 11/3055* (2013.01)

(58) Field of Classification Search
CPC .......... G06F 9/4406; G06F 11/3055
See application file for complete search history.

(56) References Cited

U.S. PATENT DOCUMENTS

| | | | |
|---|---|---|---|
| 6,496,880 B1 | 12/2002 | Ma et al. | |
| 2016/0011646 A1 | 1/2016 | Maity et al. | |
| 2018/0060084 A1* | 3/2018 | Thomas | ................ G06F 9/4416 |
| 2020/0142738 A1* | 5/2020 | Grobelny | ................ G06F 21/74 |

FOREIGN PATENT DOCUMENTS

| | | |
|---|---|---|
| WO | 2015188055 A1 | 12/2015 |
| WO | 2016149078 A2 | 9/2016 |

OTHER PUBLICATIONS

"International Search Report and Written Opinion Issued in PCT Application No. PCT/US2021/020563", dated Jun. 18, 2021, 11 Pages.

* cited by examiner

*Primary Examiner* — Zachary K Huson
(74) *Attorney, Agent, or Firm* — Ray Quinney & Nebeker; Thomas M. Hardman; Bo Niu

(57) ABSTRACT

A computer system includes a host processor including a hardware interrupt pin. The computer system also includes host firmware including an interrupt handler. The interrupt handler includes a plurality of sets of instructions that are executable by the host processor. The computer system also includes a baseboard management controller (BMC) that is connected to the hardware interrupt pin. The BMC is configured to generate an interrupt signal on the hardware interrupt pin in response to occurrence of a triggering event. The BMC is also configured to provide the host processor with context information that identifies a set of instructions in the host firmware that should be executed in response to the interrupt signal.

20 Claims, 7 Drawing Sheets

METHOD TO OVERLOAD HARDWARE PIN FOR IMPROVED SYSTEM MANAGEMENT

CROSS-REFERENCE TO RELATED APPLICATIONS

N/A

BACKGROUND

Cloud computing is the delivery of computing services (e.g., servers, storage, databases, networking, software, analytics) over the Internet. Broadly speaking, a cloud computing system includes two sections, a front end and a back end, that are in communication with one another via the Internet. The front end includes the interface that users encounter through a client device. The back end includes the resources that deliver cloud-computing services, including processors, memory, storage, and networking hardware.

The back end of a cloud computing system typically includes one or more datacenters, which may be located in different geographical areas. Each datacenter typically includes a large number (e.g., hundreds or thousands) of servers. These servers may be referred to as host computing devices. Each host computing device can be used to run one or more virtual machines. In this context, the term "host computing device" refers to a physical computer system, while the term "virtual machine" refers to an emulation of a computer system on a host computing device.

Host computing devices in a cloud computing system can be configured with at least two distinct layers: a system layer and a management layer. The system layer includes system firmware (e.g., Unified Extensible Firmware Interface (UEFI), Basic Input/Output System (BIOS)), device firmware, an operating system, a hypervisor, virtual machines, and so forth. The management layer can include an auxiliary service processor such as a baseboard management controller (BMC), as well as a rack/chassis level management software stack that in turn works with the BMC.

The BMC is a specialized microcontroller that can be embedded on the motherboard of a host computing device. It can be useful for BMCs to be included in host computing devices within a cloud computing system because they allow system administrators to perform various tasks remotely. For example, a system administrator can remotely communicate with a BMC to take corrective actions, such as resetting or power cycling a host computing device.

Under some circumstances, the components within the system layer of a host computing device and the components within the management layer of a host computing device can work together. For example, hardware errors detected by the BMC can be communicated to the system firmware and/or the operating system for the purposes of graceful error handling, error containment, field-replaceable unit (FRU) isolation and logging, etc. As another example, the BMC can be responsible for actively monitoring battery events and communicating them to the operating system via the system firmware.

Communication between system layer components and management layer components can be made possible by provisions in the hardware of a host computing device. For example, one or more of the digital signal pins (e.g., general-purpose input/output (GPIO) pins) on the host processor can be reserved for interrupt signals from the BMC. A digital signal pin that is reserved for an interrupt signal from the BMC may be referred to herein as a hardware interrupt pin. A hardware interrupt pin can be dedicated to a particular function. When the BMC generates an interrupt signal on a hardware interrupt pin (e.g., by changing the state of the hardware interrupt pin from low to high or vice versa), the host processor can perform the function that is associated with that particular hardware interrupt pin (e.g., communicating certain information to the system firmware and/or the operating system).

Unfortunately, current approaches require hardware interrupt pins to be reserved during hardware design in order to implement a particular function. This provides limited flexibility. For example, suppose that a host computing device is designed such that the host processor includes only one hardware interrupt pin. With current approaches, this means that only one function involving the BMC and the host processor can be implemented. Even if a host computing device is designed such that the host processor includes a plurality of hardware interrupt pins, the number of functions involving the BMC and the host processor is still quite limited. In general, if a host computing device is designed such that the host processor includes N hardware interrupt pins (where N is a positive integer), this means that only N different functions involving the BMC and the host processor can be implemented with current approaches. However, after the hardware for the host computing device has been designed, users (e.g., system administrators) might think of additional functions involving the BMC and the host processor that would be useful to implement. Users might also want to change at least some functions involving the BMC and the host processor from time to time. Benefits may therefore be realized by techniques that enable greater flexibility in connection with the types and varieties of functions that can be implemented involving a BMC and a host processor.

SUMMARY

In accordance with one aspect of the present disclosure, a computer system is disclosed that includes a host processor that includes a hardware interrupt pin. The computer system also includes host firmware that includes an interrupt handler. The interrupt handler may include a plurality of sets of instructions that are executable by the host processor. The computer system also includes a baseboard management controller (BMC) that is connected to the hardware interrupt pin. The BMC is configured to generate an interrupt signal on the hardware interrupt pin in response to occurrence of a triggering event and to provide the host processor with context information that identifies a set of instructions in the host firmware that should be executed in response to the interrupt signal.

The BMC may be additionally configured to detect the occurrence of the triggering event. The BMC may generate the interrupt signal and provides the host processor with the context information in response to detecting the occurrence of the triggering event.

The interrupt handler may be configured so that the host processor executes the set of instructions identified by the context information in response to the interrupt signal and the host processor does not execute other sets of instructions in the interrupt handler in response to the interrupt signal.

The host processor may obtain the context information via an input/output read instruction that is native to the host processor.

The BMC may further include BMC firmware. The BMC firmware may define the context information and a triggering event for each of the plurality of sets of instructions in the interrupt handler.

The BMC firmware may be configured so that in response to occurrence of a triggering event, execution of the BMC firmware by the BMC processor causes the context information that is associated with the triggering event to be provided to the host processor.

Providing the host processor with the context information may include writing the context information to a memory location that is shared by the BMC and the host processor and that is accessible via a data communication interface.

Providing the host processor with the context information may include writing the context information to a memory location that is native to the host processor and that is accessible to the BMC via a data communication interface.

The BMC may be additionally configured to provide a code segment to the host processor along with the context information.

Each of the plurality of sets of instructions in the interrupt handler may be associated with an identifier. The context information may include the identifier that is associated with the set of instructions that should be executed.

Each of the plurality of sets of instructions in the interrupt handler may be associated with an identifier. Each identifier that is associated with a particular set of instructions in the interrupt handler may be associated with a triggering event in the BMC firmware.

In accordance with another aspect of the present disclosure, a baseboard management controller (BMC) includes a connector that facilitates electronic communication between the BMC and a hardware interrupt pin of a host processor, a BMC processor, and BMC firmware in electronic communication with the BMC processor. The BMC firmware defines context information and triggering events for a plurality of sets of instructions that are included in an interrupt handler in host firmware. The BMC firmware includes instructions that are executable by the BMC processor to generate an interrupt signal on the hardware interrupt pin and provide the context information that corresponds to a triggering event to the host processor.

The BMC firmware may further include additional instructions that are executable by the BMC processor to detect occurrence of the triggering event. The interrupt signal may be generated and the context information may be provided to the host processor in response to detecting the occurrence of the triggering event.

Providing the context information to the host processor may include writing the context information to a memory location that is shared by the BMC and the host processor and that is accessible via a data communication interface.

Providing the context information to the host processor may include writing the context information to a memory location that is native to the host processor and that is accessible to the BMC via a data communication interface.

The BMC firmware may include additional instructions that are executable by the BMC processor to provide a code segment to the host processor along with the context information.

Each of the plurality of sets of instructions in the interrupt handler may be associated with an identifier. The context information may include the identifier that is associated with the set of instructions that should be executed.

Each of the plurality of sets of instructions in the interrupt handler may be associated with an identifier. Each identifier that is associated with a particular set of instructions in the interrupt handler may be associated with a triggering event in the BMC firmware.

In accordance with another aspect of the present disclosure, a method is disclosed that includes providing host firmware that includes an interrupt handler. The interrupt handler may include a plurality of sets of instructions corresponding to different functions that can be performed by a host processor in response to an interrupt signal on a hardware interrupt pin. The method also includes providing baseboard management controller (BMC) firmware that defines context information and triggering events for the interrupt handler. The context information includes different identifiers for different sets of instructions in the interrupt handler. The triggering events indicate when particular sets of instructions should be executed. The method also includes configuring a plurality of host computing devices with the host firmware and the BMC firmware. The method also includes providing updated host firmware that includes a modified plurality of sets of instructions in the interrupt handler. The method also includes providing updated BMC firmware that includes updated context information and updated triggering events for the modified plurality of sets of instructions. The method also includes configuring the plurality of host computing devices with the updated host firmware and the updated BMC firmware.

The modified plurality of sets of instructions may include at least one of an additional set of instructions that is not included in the plurality of sets of instructions or a modified version of a set of instructions that is included in the plurality of sets of instructions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
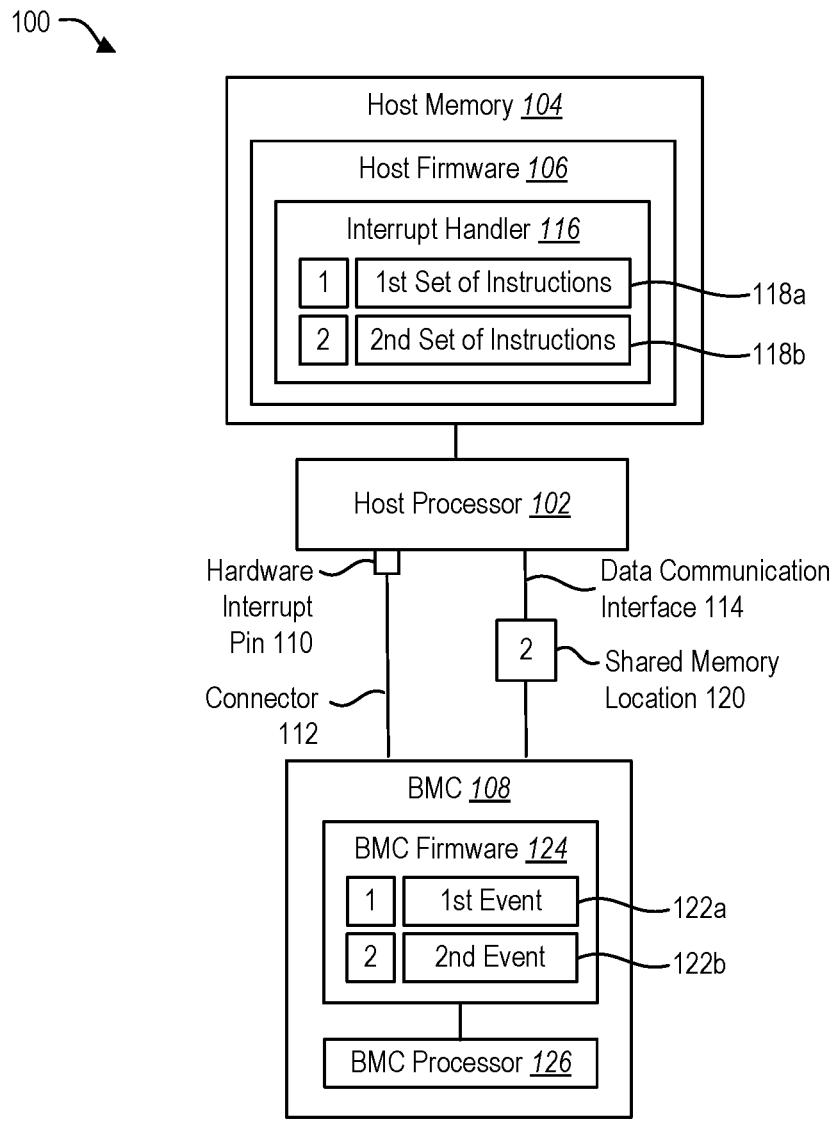
FIG. 1 illustrates an example of a host computing device in which the techniques disclosed herein can be utilized.

The present disclosure is generally related to techniques for leveraging a host computing device's existing hardware infrastructure to enable greater flexibility in connection with the types and varieties of functions that can be implemented involving a BMC and a host processor.

The techniques disclosed herein can be utilized in a host computing device in which the host processor includes one or more hardware interrupt pins for receiving hardware interrupt signals from the BMC. The host computing device can also include a data communication interface (e.g., a low pin count (LPC) bus) between the host processor and the BMC.

The techniques disclosed herein make it possible for the BMC to use a single hardware interrupt pin to cause the host processor to perform different types of functions in response to the occurrence of different types of events. To achieve this objective, the BMC provides the host processor with context information when the BMC generates an interrupt signal on a hardware interrupt pin. This can be referred to as "overloading" the hardware interrupt pin.

In accordance with the techniques disclosed herein, the host firmware includes different sets of instructions corresponding to different functions that can be implemented by a host processor. The BMC can cause the host processor to perform a particular function by generating an interrupt signal on a hardware interrupt pin and communicating context information to the host processor. The context information informs the host processor about which function should be implemented. For example, the context information can indicate to the host processor which set of instructions in the host firmware should be executed.

There are several different ways that the BMC can provide the context information to the host processor. For example, in some embodiments, the BMC can write the context information to a memory location that is shared by both the BMC and the host processor and that is accessible via a data communication interface, such as the LPC bus. Alternatively, in other embodiments, the BMC can write context information to a storage location that is native to the host processor. For example, the BMC can write context information to model-specific registers (MSRs) that are native to the host processor. The MSRs can be accessible to the BMC via a data communication interface.

In some embodiments, the BMC can provide a code segment along with the context information. This can be useful when it is desirable for the host processor to perform a function that is not already programmed in the host firmware. One of the sets of instructions in the host firmware can be configured to cause the host processor to read and execute the code segment that is provided along with the context information. The BMC can cause the host processor to take some action that is not already programmed in the host firmware by generating an interrupt signal on a hardware interrupt pin and communicating context information that causes the host processor to execute this set of instructions in the host firmware.

FIG. 1 illustrates an example of a host computing device 100 in which the techniques disclosed herein can be utilized. The host computing device 100 includes a processor 102 and memory 104 in electronic communication with the processor 102. The processor 102 may be referred to herein as a host processor 102, and the memory 104 may be referred to herein as host memory 104.

Firmware 106 is stored in the host memory 104. The firmware 106 may be referred to herein as host firmware 106. The host firmware 106 can be stored in persistent memory within the host memory 104. The host firmware 106 can include system firmware (e.g., UEFI, BIOS) as well as device firmware, option ROMs, etc.

The host computing device 100 also includes a BMC 108. As discussed above, the BMC 108 is a specialized microcontroller that can be embedded on the motherboard of a host computing device 100. The BMC 108 can be connected to a hardware interrupt pin 110 on the host processor 102. In some embodiments, the hardware interrupt pin 110 can be a GPIO pin. The BMC 108 can include a connector 112 that is electrically connected to the hardware interrupt pin 110. The BMC 108 can interrupt the host processor 102 by generating an interrupt signal on the hardware interrupt pin 110.

Generating an interrupt signal on a hardware interrupt pin 110 can include changing the state of the hardware interrupt pin 110 from a default state to another state. For example, generating an interrupt signal on a hardware interrupt pin 110 can include changing the state of the hardware interrupt pin 110 from low to high (or vice versa). Generating an interrupt signal on a hardware interrupt pin 110 can also be referred to as generating an interrupt signal on the hardware interrupt pin 110.

The BMC 108 and the host processor 102 are also connected via a data communication interface 114. In some embodiments, the data communication interface 114 can be an LPC bus.

The host firmware 106 includes an interrupt handler 116. The interrupt handler 116 includes different sets of instructions corresponding to different functions that can be performed in response to an interrupt signal on the hardware interrupt pin 110. FIG. 1 shows the interrupt handler 116 with two different sets of instructions: a first set of instructions 118a and a second set of instructions 118b. The host processor 102 can execute the first set of instructions 118a to perform a first function. The host processor 102 can execute the second set of instructions 118b to perform a second function.

For the sake of simplicity, only two sets of instructions 118a-b are shown in FIG. 1. However, this should not be interpreted as limiting the scope of the present disclosure. An interrupt handler 116 in accordance with the present disclosure can include more than two sets of instructions.

Having different sets of instructions 118a-b in the host firmware 106 enables the host processor 102 to perform different types of functions in different circumstances. For example, under some circumstances, the host processor 102 can perform a first function by executing the first set of instructions 118a (without executing the second set of instructions 118b). Under other circumstances, however, the host processor 102 can perform a second function by executing the second set of instructions 118b (without executing the first set of instructions 118a).

The BMC 108 can cause the host processor 102 to perform a specific function by generating an interrupt signal on the hardware interrupt pin 110 and providing the BMC 108 with context information that directs the host processor 102 to execute a specific set of instructions in the interrupt handler 116. For example, the BMC 108 can cause the host processor 102 to perform a first function by generating an interrupt signal on the hardware interrupt pin 110 and providing the BMC 108 with context information that directs the host processor 102 to execute the first set of instructions 118a in the interrupt handler 116. Alternatively, the BMC 108 can cause the host processor 102 to perform a second function by generating an interrupt signal on the hardware interrupt pin 110 and providing the BMC 108 with context information that directs the host processor 102 to execute the second set of instructions 118b in the interrupt handler 116.

The BMC 108 can provide the context information to the host processor 102 by writing the context information to a memory location 120 that is shared by the BMC 108 and the host processor 102. The shared memory location 120 can be accessible to the BMC 108 and to the host processor 102 via the data communication interface 114.

The host processor 102 can be configured to check this shared memory location 120 in response to detecting an interrupt signal on the hardware interrupt pin 110. Therefore, in order to communicate context information to the host processor 102, the BMC 108 can write the context information to the shared memory location 120 and generate an interrupt signal on the hardware interrupt pin 110. Generating the interrupt signal on the hardware interrupt pin 110 causes the host processor 102 to check the shared memory location 120 and retrieve the context information.

The context information can include an identifier corresponding to the set of instructions that should be executed. The code in the interrupt handler 116 can be structured such that each set of instructions is associated with a particular identifier. In the example shown in FIG. 1, the first set of instructions 118a is associated with the identifier "1" and the second set of instructions 118b is associated with the identifier "2."

Of course, the specific identifiers shown in FIG. 1 (namely, "1" and "2") are provided for purposes of example only and should not be interpreted as limiting the scope of the present disclosure. An identifier can be represented using any symbol or combination of symbols that can be included within firmware code and associated with a set of instructions.

To cause the host processor 102 to execute a particular set of instructions (and thereby perform a particular function), the BMC 108 can write the identifier corresponding to that set of instructions to the shared memory location 120. For example, to cause the host processor 102 to execute the first set of instructions 118a (and thereby perform a first function), the BMC 108 can write the identifier "1" to the shared memory location 120. Similarly, to cause the host processor 102 to execute the second set of instructions 118b (and thereby perform a second function), the BMC 108 can write the identifier "2" to the shared memory location 120. As an example, FIG. 1 shows the identifier "2" in the shared memory location 120.

The BMC 108 can be configured to cause the host processor 102 to perform particular functions when certain triggering events take place. In this context, the term "triggering event" can refer to an event that causes the BMC 108 to generate an interrupt signal on the hardware interrupt pin 110. For example, triggering events can include hardware errors detected by the BMC 108. As another example, the host computing device 100 can include different types of sensors that report to the BMC 108 on various parameters (e.g., temperature, cooling fan speeds, power status, operating system status). A triggering event could be that the value of a particular parameter falls outside of a desired range (e.g., the temperature exceeds a defined threshold value).

When the BMC 108 detects a triggering event, the BMC 108 can generate an interrupt signal on the hardware interrupt pin 110 and provide context information to the host processor 102 (e.g., by writing the context information to the shared memory location 120), thereby causing the host processor 102 to execute one of the sets of instructions in the interrupt handler 116.

To facilitate this kind of interaction between the BMC 108 and the host processor 102, the identifiers that are associated with particular sets of instructions in the interrupt handler 116 can be associated with particular triggering events in the BMC firmware 124. In the depicted example, the identifier "1" is associated with the first set of instructions 118a in the interrupt handler 116 and a first triggering event 122a in the BMC firmware 124. Similarly, the identifier "2" is associated with the second set of instructions 118b in the interrupt handler 116 and a second triggering event 122b in the BMC firmware 124.

In other words, the BMC firmware 124 defines context information and triggering events for the sets of instructions 118a-b that are included in the interrupt handler 116 in the host firmware 106. The BMC firmware 124 also includes instructions that are executable by the BMC processor 126 to take certain actions when a triggering event is detected. More specifically, when the BMC 108 detects a particular triggering event, the BMC 108 can write the corresponding identifier to the shared memory location 120 and generate an interrupt signal on the hardware interrupt pin 110. This causes the host processor 102 to retrieve the identifier from the shared memory location 120 and perform the desired function by executing the corresponding set of instructions in the interrupt handler 116. For example, if the BMC 108 detects the first triggering event 122a, the BMC 108 can write the identifier "1" to the shared memory location 120 and generate an interrupt signal on the hardware interrupt pin 110. This causes the host processor 102 to perform a first function by executing the first set of instructions 118a. On the other hand, if the BMC 108 detects the second triggering event 122b, the BMC 108 can write the identifier "2" to the shared memory location 120 and generate an interrupt signal on the hardware interrupt pin 110. This causes the host processor 102 to perform a second function by executing the second set of instructions 118b. Thus, the BMC 108 can use a single hardware interrupt pin 110 to cause the host processor 102 to perform different types of functions in response to the occurrence of different types of triggering events.

Advantageously, the mechanism shown in FIG. 1 enables the BMC 108 to communicate context information to the host processor 102 relatively quickly. The host processor 102 is able to obtain the context information (and determine what set of instructions should be executed) via an I/O read instruction that is native to the host processor 102. This is significantly faster than if the context information were provided via an Intelligent Platform Management Interface (IPMI) command.

In addition, the functions that the BMC 108 can cause the host processor 102 to perform and the triggering events that are associated with those functions can be changed over time. For example, a new function can be added by updating the interrupt handler 116 to include a new set of instructions, and by updating the BMC firmware 124 to define an triggering event that causes the new set of instructions to be executed. As another example, an existing function can be changed by modifying an existing set of instructions within the interrupt handler 116. The triggering event that causes this set of instructions to be executed can also be modified by updating the BMC firmware 124.

Figure 1A:
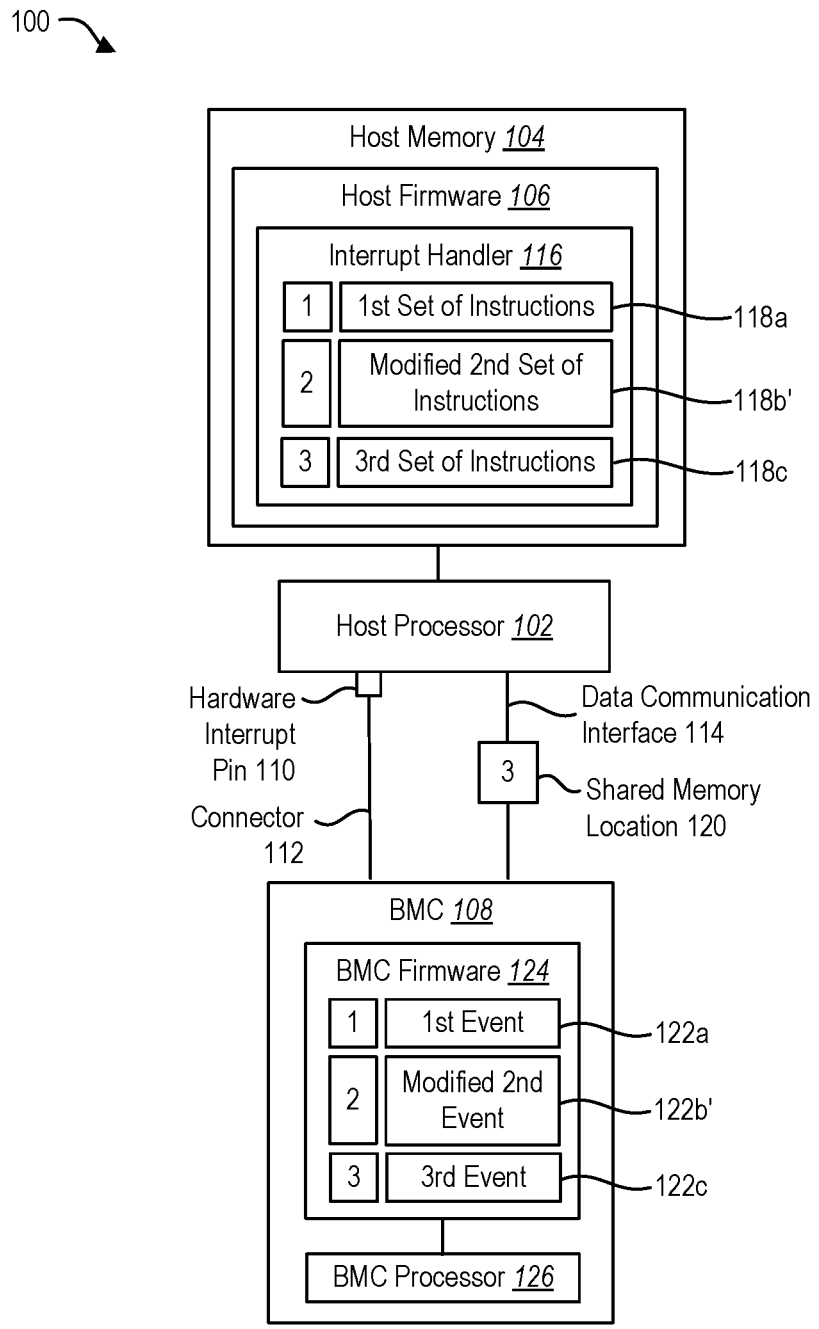
FIG. 1A illustrates an example showing how the types of functions that the BMC can cause the host processor to perform and the types of triggering events that are associated with those functions can be changed over time.

FIG. 1A illustrates an example showing how the types of functions that the BMC 108 can cause the host processor 102 to perform and the types of triggering events that are associated with those functions can be changed over time. In particular, FIG. 1A illustrates the host computing device 100 at a subsequent point in time relative to FIG. 1. In other words, if FIG. 1 shows the host computing device 100 at time t, FIG. 1A shows the host computing device 100 at time t+Δt (where Δt is a positive value). It will be assumed that the host firmware 106 and the BMC firmware 124 have been updated between time t and time t+Δt.

At time t+Δt, the host firmware 106 and the BMC firmware 124 have been updated to support a new function. In particular, the host firmware 106 has been updated to include a third set of instructions 118c. The host processor 102 can execute the third set of instructions 118c to perform the new function. In addition, the BMC firmware 124 has been updated to define a third triggering event 122c. The third triggering event 122c causes the third set of instructions 118c to be executed. The identifier "3" is associated with the third set of instructions 118c in the interrupt handler 116. The identifier "3" is also associated with the third triggering event 122c in the BMC firmware 124. When the BMC 108 detects the third triggering event 122c, the BMC 108 can write the identifier "3" to the shared memory location 120 and generate an interrupt signal on the hardware interrupt pin 110. This causes the host processor 102 to perform the new function by executing the third set of instructions 118c. FIG. 1A shows the identifier "3" in the shared memory location 120.

The host firmware 106 and the BMC firmware 124 have also been updated to modify the second function that was previously supported. In particular, the host firmware 106 has been updated to include a modified second set of instructions 118b', and the BMC firmware 124 has been updated to include a modified second triggering event 122b'. At time t, the identifier "2" was associated with the second set of instructions 118b in the interrupt handler 116 and the second triggering event 122b in the BMC firmware 124 (as shown in FIG. 1). At time t+Δt, however, the identifier "2" is associated with the modified second set of instructions 118b' in the interrupt handler 116 and the modified second triggering event 122b' in the BMC firmware 124. Between time t and time t+Δt, the occurrence of the second triggering event 122b causes the BMC 108 to write the identifier "2" to the shared memory location 120 and generate an interrupt signal on the hardware interrupt pin 110. This causes the host processor 102 to perform the second function by executing the second set of instructions 118b. However, at time t+Δt or thereafter, the occurrence of the second triggering event 122b no longer causes the BMC 108 to write the identifier "2" to the shared memory location 120. Instead, the occurrence of the modified second triggering event 122b' causes the BMC 108 to write the identifier "2" to the shared memory location 120 and generate an interrupt signal on the hardware interrupt pin 110. This causes the host processor 102 to perform the modified second function by executing the modified second set of instructions 118b'.

Thus, the techniques disclosed herein enable a relatively simple and efficient way to change the functions that can be performed via interactions between the BMC 108 and the host processor 102 as well as the triggering events that are associated with those functions. This provides several advantages relative to current approaches.

For example, as discussed above, current approaches require hardware interrupt pins to be reserved during hardware design in order to implement a particular function. Each hardware interrupt pin on a host processor can be dedicated to a particular function. When a BMC generates an interrupt signal on a particular hardware interrupt pin of a host processor, the host processor carries out the function that is associated with that hardware interrupt pin.

Once a host processor has been designed with a certain number of hardware interrupt pins that are reserved for implementing a certain number of functions, then it is not possible with current approaches to subsequently modify that host processor to add a new function or modify any of the existing functions. Of course, a new host processor could be designed with the desired modifications (e.g., additional hardware interrupt pins and/or modified functions for existing hardware interrupt pins), but the functions that can be performed by the already existing host processor are limited by the previous design.

In contrast, the techniques disclosed herein make it possible to easily change the functions that are performed by a host processor 102 in response to a hardware interrupt signal from the BMC 108. New functions can be added and existing functions can be modified simply by updating the host firmware 106 and the BMC firmware 124.

This can be particularly beneficial for entities such as cloud computing providers who operate datacenters with large numbers of host computing devices. Suppose that a cloud computing provider purchases thousands of host computing devices that are designed in accordance with current approaches. In particular, suppose that each host computing device includes a host processor that has N hardware interrupt pins that are reserved for receiving hardware interrupt signals from a BMC (where the value of N is a positive integer). Each of these N hardware interrupt pins can be dedicated to a particular function. Therefore, the BMC can cause the host processor to carry out N different functions.

However, even if only N functions are needed when the host processors are initially designed, at a subsequent point in time there may be a need for one or more additional functions. With current approaches, however, the only way for the cloud computing provider to add new functions would be to replace the host processors with new host processors that have been designed with additional hardware interrupt pins. Replacing the host processors in this way would be cost prohibitive in most cases. Moreover, even setting aside the issue of cost, replacing the host processors in this way would only be a temporary solution, because at some point after the host processors have been replaced with the new design there would almost certainly be a need to add still more functions.

With the techniques disclosed herein, however, even if a host processor 102 only has a single hardware interrupt pin 110 that is reserved for receiving hardware interrupt signals from the BMC 108, this single hardware interrupt pin 110 can be used to implement a plurality of different functions in response to a plurality of different types of triggering events. Moreover, new functions can be added and existing functions can be modified simply by updating the host firmware 106 and the BMC firmware 124.

Figure 2:
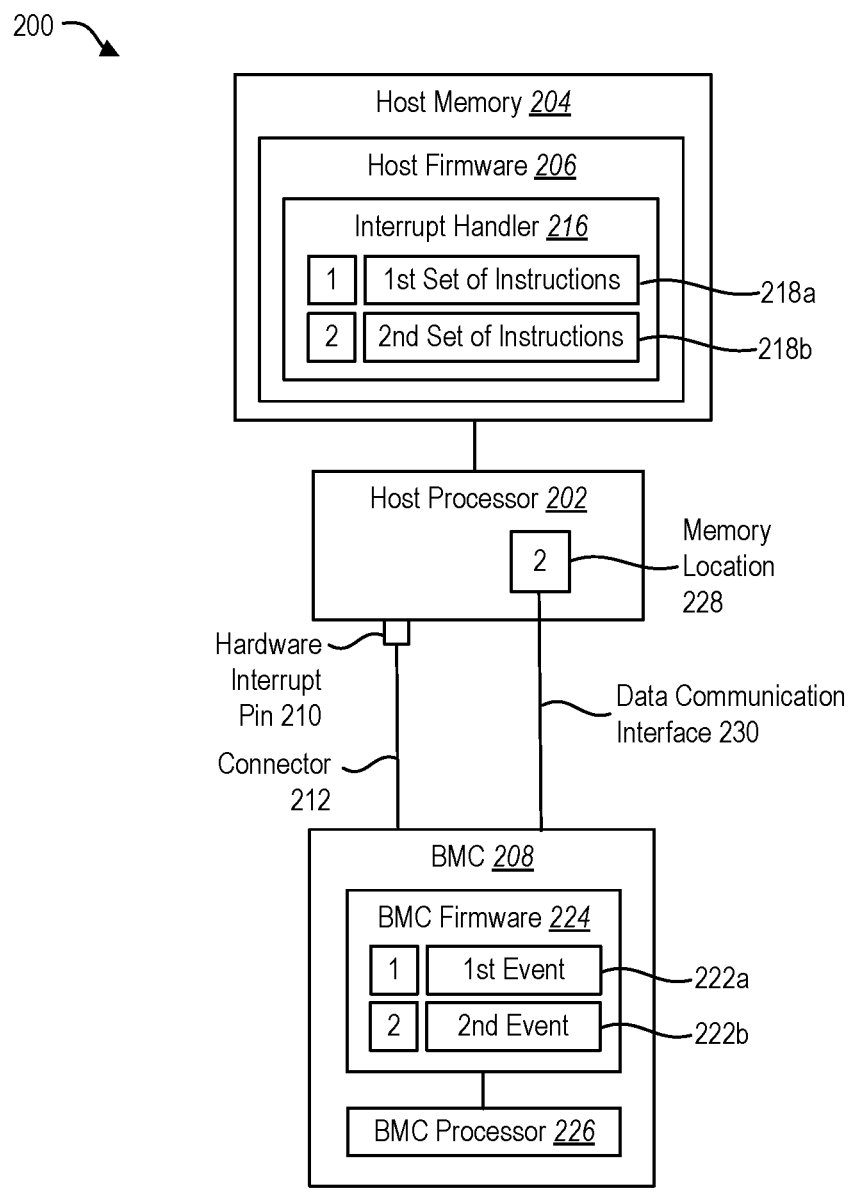
FIG. 2 illustrates an example showing how a BMC can provide context information to a host processor.

In the example shown in FIGS. 1 and 1A, the BMC 108 provides context information to the host processor 102 by writing the context information to a memory location 120 that is shared by the BMC 108 and the host processor 102. However, there are many different ways that context information can be provided to a host processor 102. FIG. 2 illustrates an example showing another way that a BMC 208 can provide context information to a host processor 202.

The host computing device 200 shown in FIG. 2 is similar in many respects to the host computing device 100 that was discussed previously in connection with FIG. 1. For example, the host computing device 200 includes a host processor 202, host memory 204, host firmware 206, and a BMC 208. The BMC 208 includes BMC firmware 224 and a BMC processor 226. The BMC 208 is connected to a hardware interrupt pin 210 on the host processor 202. The BMC 208 can interrupt the host processor 202 by generating an interrupt signal on the hardware interrupt pin 210. The host firmware 206 includes an interrupt handler 216. The interrupt handler 216 includes different sets of instructions 218a-b corresponding to different functions that can be performed in response to detecting an interrupt signal on the hardware interrupt pin 210. The BMC 208 can cause the host processor 202 to perform a specific function by generating an interrupt signal on the hardware interrupt pin 210 and providing the BMC 208 with context information that directs the host processor 202 to execute a specific set of instructions in the interrupt handler 216. The BMC firmware 224 defines the context information and triggering events 222a-b for the sets of instructions 218a-b in the interrupt handler 216. The BMC firmware 224 is configured so that in response to occurrence of a triggering event, execution of the BMC firmware 224 by the BMC processor 226 causes the context information that is associated with the triggering event to be provided to the host processor 202.

In the depicted example, the BMC 208 writes the context information to a memory location 228 that is native to the host processor 202. The memory location 228 is accessible to the BMC 208 via a data communication interface 230 that connects the BMC 208 to the host processor 202.

In some embodiments, the memory location 228 within the host processor 202 can include one or more model-specific registers (MSRs). The MSRs can be accessible to the BMC 208 via a data communication interface 230 such as the Platform Environment Control Interface (PECI) bus. The PECI bus is generally used to permit access to digital data concerning processor temperature information obtained from digital thermal sensors within the host processor 202. In accordance with the present disclosure, the PECI bus can be used to enable the BMC 208 to write context information to MSRs within the host processor 202.

Figure 3:
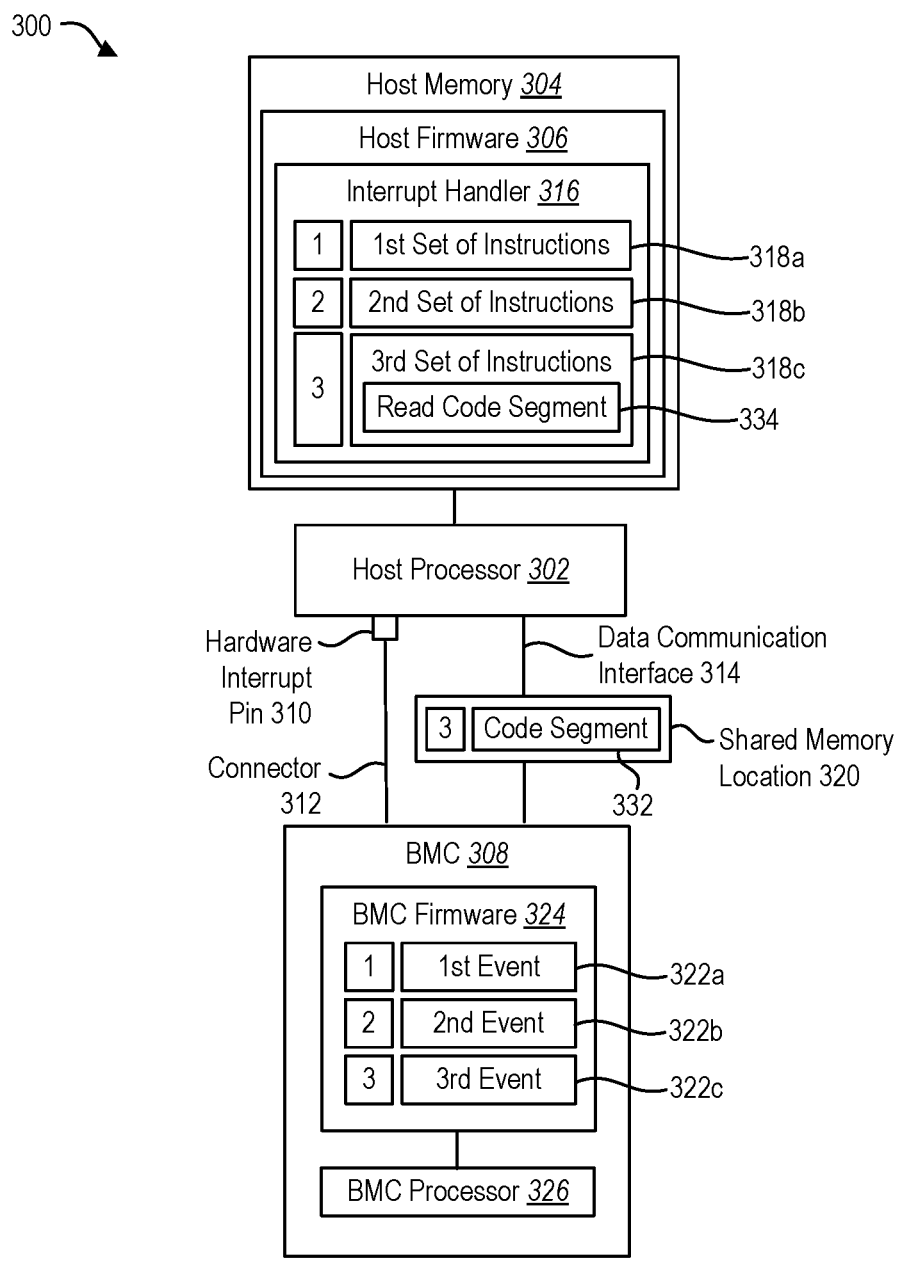
FIG. 3 illustrates an example in which the BMC provides a code segment to the host processor along with the context information.

FIG. 3 illustrates an example in which the BMC 308 provides a code segment 332 to the host processor 302 along with the context information. As discussed above, this can be useful when it is desirable for the host processor 302 to perform a function that is not already programmed in the host firmware 306.

The host computing device 300 shown in FIG. 3 is similar in many respects to the host computing device 100 that was discussed previously in connection with FIG. 1. For example, the host computing device 300 includes a host processor 302, host memory 304, host firmware 306, and a BMC 308. The BMC 308 includes BMC firmware 324 and a BMC 308 processor. The BMC 308 is connected to a hardware interrupt pin 310 on the host processor 302. The BMC 308 can interrupt the host processor 302 by generating an interrupt signal on the hardware interrupt pin 310. The host firmware 306 includes an interrupt handler 316. The interrupt handler 316 includes different sets of instructions 318a-c corresponding to different functions that can be performed in response to detecting an interrupt signal on the hardware interrupt pin 310. The BMC 308 can cause the host processor 302 to perform a specific function by generating an interrupt signal on the hardware interrupt pin 310 and providing the BMC 308 with context information that directs the host processor 302 to execute a specific set of instructions in the interrupt handler 316. The BMC firmware 324 defines the context information and triggering events 322a-c for the sets of instructions 318a-c in the interrupt handler 316. The BMC firmware 324 is configured so that in response to occurrence of a triggering event, execution of the BMC firmware 324 by the BMC 308 processor causes the context information that is associated with the triggering event to be provided to the host processor 302.

In the depicted example, the interrupt handler 316 includes a set of instructions 318c that is configured to cause the host processor 302 to read and execute the code segment 332 that is provided along with the context information. In particular, the third set of instructions 318c includes an instruction 334 to read the code segment 332. This makes it possible for the BMC 308 to cause the host processor 302 to perform some function that is not already programmed in the host firmware 306. To do this, a code segment 332 can be created that causes the function to be performed when the code segment 332 is executed by the host processor 302. The BMC 308 can then generate an interrupt signal on the hardware interrupt pin 310 and communicate the context information (which is the identifier "3" in this example) and the code segment 332 to the host processor 302. This causes the host processor 302 to execute the third set of instructions 318c in the host firmware 306. When the host processor 302 executes the third set of instructions 318c, the host processor 302 also reads the instruction 334 to read the code segment 332. Therefore, the host processor 302 reads and executes the code segment 332 that is provided along with the context information.

The context information and the code segment 332 can be provided to the host processor 302 using any of the techniques discussed previously. FIG. 3 shows the BMC 308 providing the context information and the code segment 332 to the host processor 302 by writing the context information and the code segment 332 to a memory location 320 that is shared by the BMC 308 and the host processor 302. As another example, the BMC 308 can write the context information and the code segment 332 to a memory location that is native to the host processor 302 (as discussed above in connection with FIG. 2). As another example, the BMC 308 can provide the context information and the code segment 332 to the host processor 302 by sending an IPMI command to the host processor 302.

Figure 4:
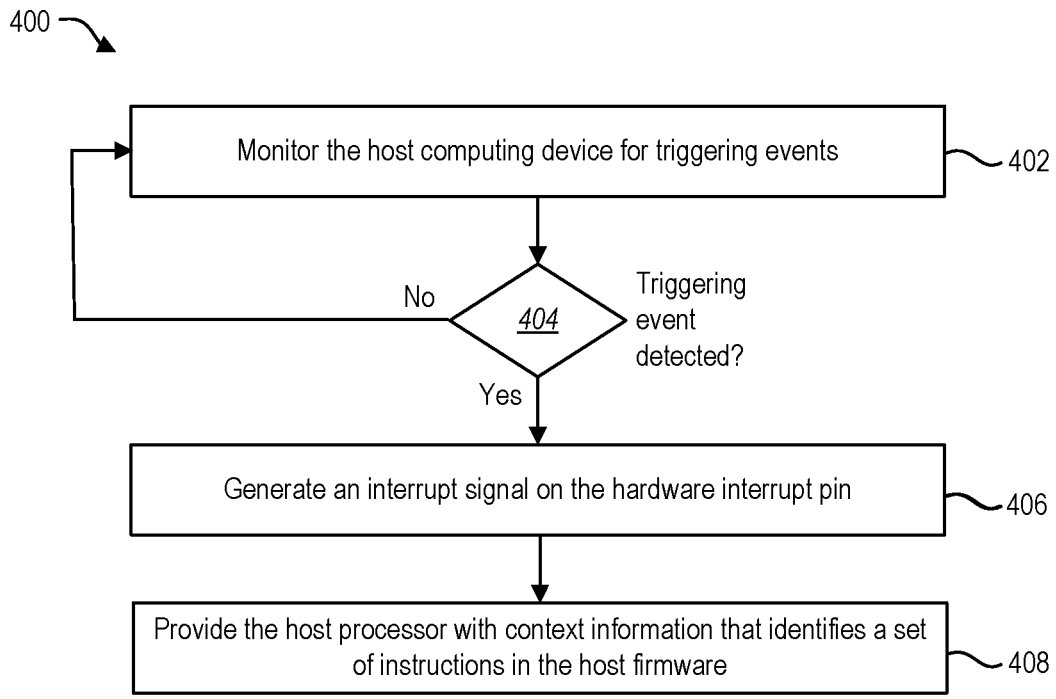
FIG. 4 illustrates an example of a method that can be performed by a BMC in accordance with the present disclosure.

FIG. 4 illustrates an example of a method 400 that can be performed by a BMC 108. Aspects of the method 400 will be described in relation to the host computing device 100 shown in FIG. 1.

As discussed above, certain triggering events 122a-b can be defined in the BMC firmware 124. The method 400 can include monitoring 402 the host computing device 100 for any of these triggering events 122a-b. For example, monitoring 402 the host computing device 100 for triggering events 122a-b can include monitoring the host computing device 100 for errors. As another example, monitoring 402 the host computing device 100 for triggering events 122a-b can include monitoring the values of various parameters to see whether they have fallen outside of a desired range (e.g., whether the temperature exceeds a defined threshold value).

At some point, the BMC 108 can detect 404 the occurrence of a triggering event. In response, the BMC 108 can generate 406 an interrupt signal on the hardware interrupt pin 110. The BMC 108 can also provide 408 the host processor 102 with context information that identifies a set of instructions in the host firmware 106 that should be executed in response to the interrupt signal.

As discussed above in connection with FIG. 1, in some embodiments providing 408 the host processor 102 with the context information can include writing the context information to a memory location 120 that is shared by the BMC 108 and the host processor 102 and that is accessible via a data communication interface 114. As another example, as discussed above in connection with FIG. 2, in some embodiments providing 408 the host processor 202 with the context information can include writing the context information to a memory location 228 that is native to the host processor 202 and that is accessible to the BMC 208 via a data communication interface 230. As discussed above in connection with FIG. 3, in some embodiments the BMC 308 can provide a code segment 332 to the host processor 302 along with the context information.

Figure 5:
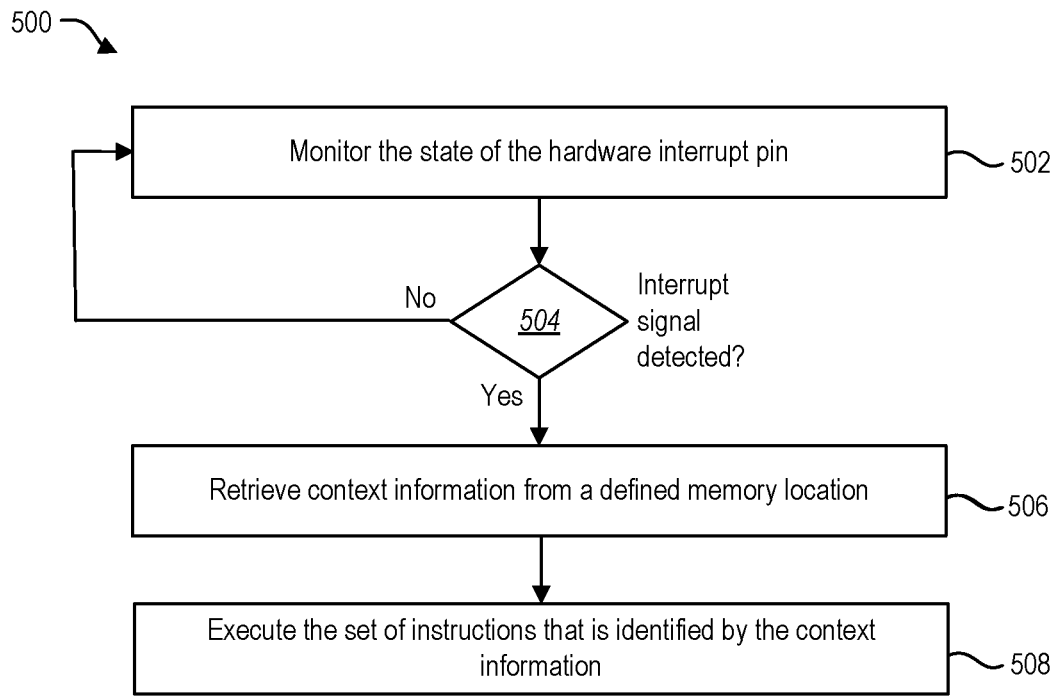
FIG. 5 illustrates an example of a method that can be performed by a host processor in accordance with the present disclosure.

FIG. 5 illustrates an example of a method 500 that can be performed by a host processor 102 in accordance with the present disclosure. Aspects of the method 500 will be described in relation to the host computing device 100 shown in FIG. 1.

The method 500 can include monitoring 502 the state of the hardware interrupt pin 110 that is connected to the BMC 108. At some point, the host processor 102 can detect 504 that an interrupt signal has been generated on the hardware interrupt pin 110. In response to detecting 504 the interrupt signal, the host processor 102 can retrieve 506 context information from a defined memory location. For example, as discussed above in connection with FIG. 1, the defined memory location can be a memory location 120 that is shared by the BMC 108 and the host processor 102 and that is accessible via a certain type of data communication interface 114 (e.g., an LPC bus). As another example, as discussed above in connection with FIG. 2, the defined memory location can be a memory location 228 that is native to the host processor 102.

In some embodiments, the sets of instructions 118*a-b* in the interrupt handler 116 can each be associated with a unique identifier, and the context information can be an identifier corresponding to one of the sets of instructions 118*a-b*. For instance, in the example shown in FIG. 1, the context information can be the identifier "2," which corresponds to the second set of instructions 118*b*.

Once the context information has been retrieved from the defined memory location, the host processor 102 can execute 508 the set of instructions that is identified by the context information. However, the host processor 102 does not execute any set(s) of instructions that are not identified by the context information. For instance, referring once again to the example shown in FIG. 1, suppose that the context information includes the identifier "2." In this case, because the identifier "2" corresponds to the second set of instructions 118*b*, the host processor 102 can execute the second set of instructions 118*b*. However, because the context information does not include an identifier for the first set of instructions 118*a*, the host processor 102 does not execute the first set of instructions 118*a*.

For the sake of simplicity, FIGS. 1, 1A, 2, and 3 each show just a single host computing device. However, the techniques disclosed herein can be applied to a large number of host computing devices. For example, the techniques disclosed herein can be utilized by a cloud computing provider that operates and manages thousands of host computing devices. A cloud computing system typically includes one or more datacenters, which may be located in different geographical areas. Each datacenter typically includes a large number of host computing devices. The host computing devices within a datacenter can be stacked in racks that are placed in rows.

Figure 6:
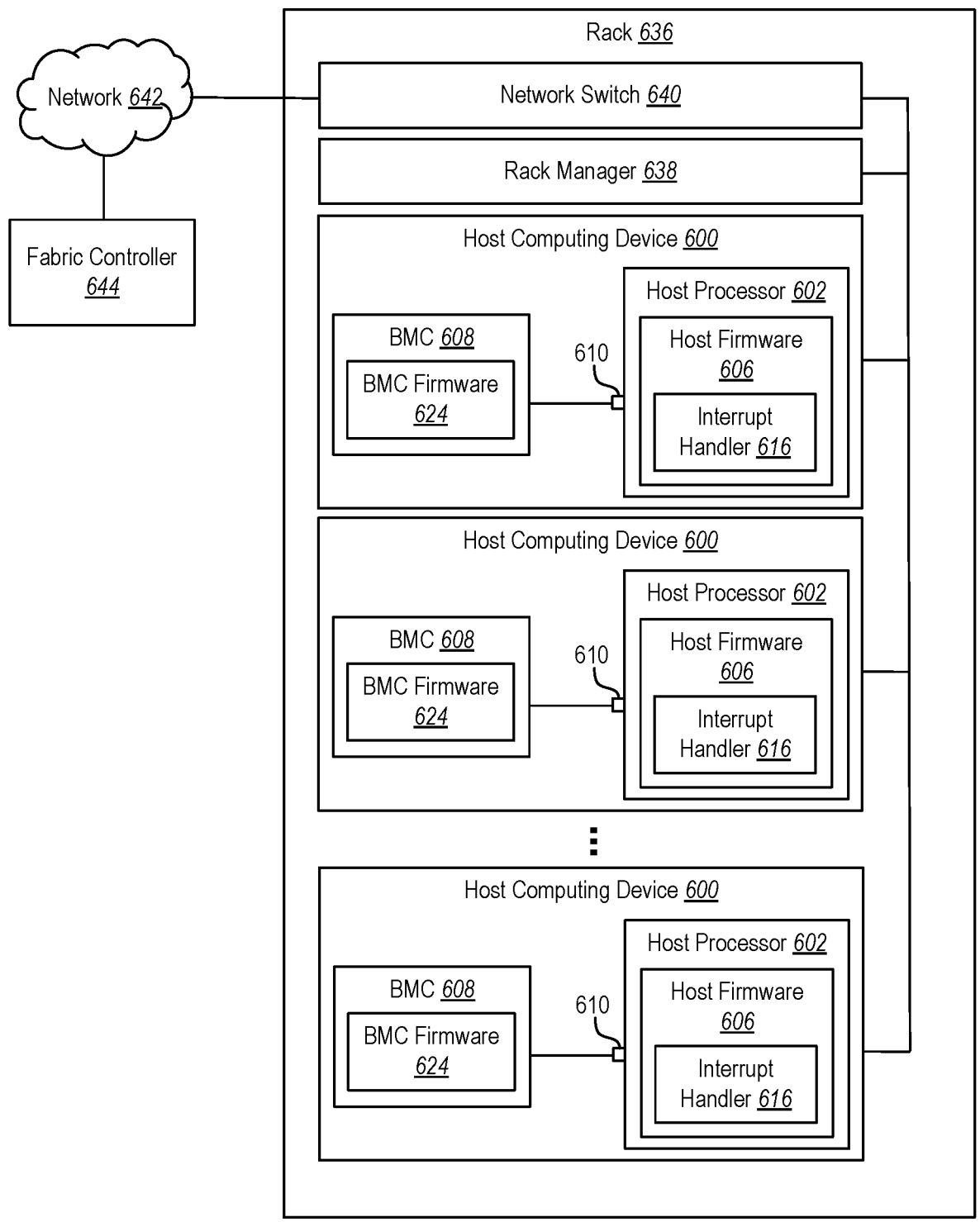
FIG. 6 illustrates an example of a rack that includes a plurality of host computing devices.

FIG. 6 illustrates an example of a rack 636 that includes a plurality of host computing devices 600. Each host computing device 600 can be configured similarly to any of the host computing devices 100, 200, 300 described previously. For example, each host computing device 600 can include a host processor 602 and a BMC 608 that is connected to a hardware interrupt pin 610 on the host processor 602. The BMC 608 can interrupt the host processor 602 by generating an interrupt signal on the hardware interrupt pin 610. The host firmware 606 includes an interrupt handler 616. The interrupt handler 616 includes different sets of instructions corresponding to different functions that can be performed in response to detecting an interrupt signal on the hardware interrupt pin 610. The BMC 608 can cause the host processor 602 to perform a specific function by generating an interrupt signal on the hardware interrupt pin 610 and providing the BMC 608 with context information that directs the host processor 602 to execute a specific set of instructions in the interrupt handler 616. The BMC firmware 624 defines the context information and triggering events for the sets of instructions in the interrupt handler 616. The BMC firmware 624 is configured so that in response to occurrence of a triggering event, execution of the BMC firmware 624 by a BMC processor causes the context information that is associated with the triggering event to be provided to the host processor 602.

The rack 636 also includes a rack manager 638 that is responsible for performing management operations with respect to the host computing devices 600 within the rack 636. FIG. 6 shows the rack manager 638 and the host computing devices 600 in electronic communication with a network switch 640, which facilitates a connection to a network 642. Thus, the rack manager 638 is able to communicate with the host computing devices 600 via a network connection.

Although not shown in FIG. 6, the rack manager 638 can also be in electronic communication with the host computing devices 600 via an out-of-band communication channel. For example, in some embodiments the rack manager 638 can be in electronic communication with the host computing devices 600 via a power distribution unit (PDU). The communication channel (or communication path) from the rack manager 638 to the host computing devices 600 via the PDU can be considered to be an out-of-band communication channel (or communication path).

A fabric controller 644 can be responsible for managing a large number of host computing devices 600, including the host computing devices 600 in the rack 636 shown in FIG. 6 as well as many other host computing devices 600 in many other racks. From time to time, the BMCs 608 on the various host computing devices 600 can report information about the host computing devices 600 to the fabric controller 644.

As discussed above, the techniques disclosed herein make it possible for a BMC 608 to use a single hardware interrupt pin 610 to cause a host processor 602 to perform a plurality of different types of functions in response to the occurrence of different types of triggering events. In addition, new functions can be added and existing functions can be modified simply by updating the host firmware 606 and the BMC firmware 624. In some embodiments, the fabric controller 644 can initiate the updating of the host firmware 606 and the BMC firmware 624. For example, the fabric controller 644 can push the updated host firmware 606 and the updated BMC firmware 624 to the rack manager 638, and the rack manager 638 can then cause the updated host firmware 606 and the updated BMC firmware 624 to be installed on the host computing devices 600.

Figure 7:
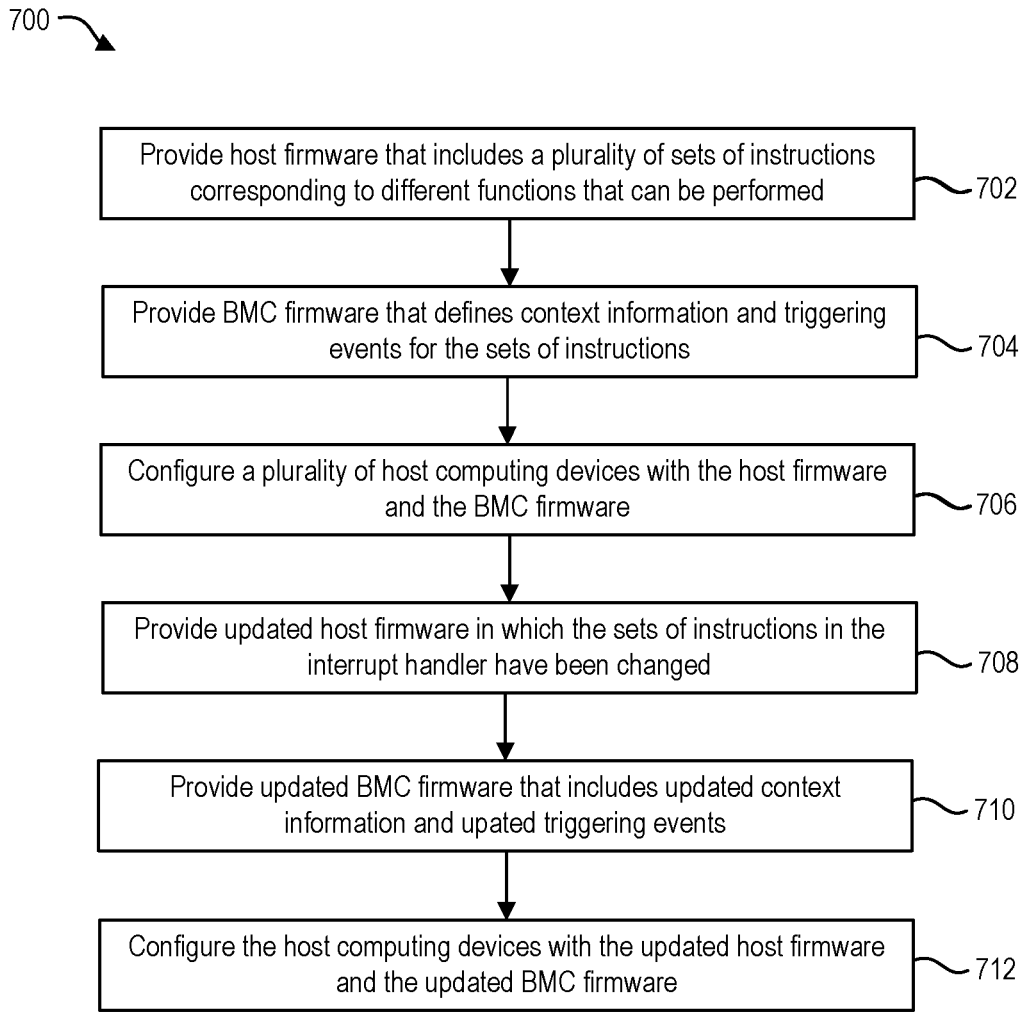
FIG. 7 illustrates an example of a method showing how the host firmware and the BMC firmware in the host computing devices shown in FIG. 6 can be configured and updated.

FIG. 7 illustrates an example of a method 700 showing how the host firmware 606 and the BMC firmware 624 in the host computing devices 600 can be configured and updated. Aspects of the method 700 will be described in relation to the host computing devices 600 in the rack 636 shown in FIG. 6.

The method 700 includes providing 702 host firmware 606 that includes a plurality of sets of instructions corresponding to different functions that can be performed in response to detecting an interrupt signal on the hardware interrupt pin 610. As an example, the host firmware 106 in the host computing device 100 shown in FIG. 1 includes these characteristics. In particular, the host firmware 106 in the host computing device 100 includes a first set of instructions 118a and a second set of instructions 118b. The host processor 102 can execute the first set of instructions 118a to perform a first function. The host processor 102 can execute the second set of instructions 118b to perform a second function.

The method 700 also includes providing 704 BMC firmware 624 that defines context information and triggering events for the sets of instructions. As an example, the BMC 108 in the host computing device 100 shown in FIG. 1 includes these characteristics. In that example, the context information includes identifiers that are associated with particular sets of instructions 118a-b in the interrupt handler 116. These identifiers are also associated with particular triggering events 122a-b in the BMC firmware 124. More specifically, the identifier "1" is associated with the first set of instructions 118a in the interrupt handler 116 and a first triggering event 122a in the BMC firmware 124. Similarly, the identifier "2" is associated with the second set of instructions 118b in the interrupt handler 116 and a second triggering event 122b in the BMC firmware 124.

The method 700 also includes configuring 706 a plurality of host computing devices 600 with the host firmware 606 and the BMC firmware 624. In some embodiments, a fabric controller 644 and a rack manager 638 can work together to configure the host computing devices 600 with the host firmware 606 and the BMC firmware 624. For example, as discussed above, the fabric controller 644 can push the host firmware 606 and the BMC firmware 624 to the rack manager 638, and the rack manager 638 can then cause the host firmware 606 and the BMC firmware 624 to be installed on the host computing devices 600.

As discussed above, the functions that the BMCs 608 can cause the host processors 602 to perform and the triggering events that are associated with those functions can be changed over time. Thus, the method 700 can include providing 708 updated host firmware 606 in which the sets of instructions in the interrupt handler 616 have been changed. As an example, the host firmware 106 in the host computing device 100 shown in FIG. 1A includes these characteristics. In particular, the host firmware 106 has been updated (relative to the previous version of the host firmware 106 shown in FIG. 1) to include a third set of instructions 118c, which was not previously included in the host firmware 106. In addition, the host firmware 106 has also been updated to include a modified second set of instructions 118b', which is a modified version of the second set of instructions 118b that was previously included in the host firmware 106.

The method 700 can also include providing 710 updated BMC firmware 624 that includes updated context information and updated triggering events for the sets of instructions in the interrupt handler 616 in the updated host firmware 606. As an example, the BMC firmware 124 in the host computing device 100 shown in FIG. 1A includes these characteristics. In particular, the BMC firmware 124 has been updated (relative to the previous version of the BMC firmware 124 shown in FIG. 1) to define a third triggering event 122c. The BMC firmware 124 is configured such that when the third triggering event 122c occurs, the BMC 108 communicates the identifier associated with the third set of instructions 118c to the host processor 102. This causes the host processor 102 to execute the third set of instructions 118c. The BMC firmware 124 has also been updated to modify the second triggering event 122b'. The BMC firmware 124 is configured such that when the modified second triggering event 122b' occurs, the BMC 108 communicates the identifier associated with the modified second set of instructions 118b' to the host processor 102. This causes the host processor 102 to execute the modified second set of instructions 118b'.

The method 700 also includes configuring 712 the host computing devices 600 with the updated host firmware 606 and the updated BMC firmware 624. As discussed above, a fabric controller 644 and a rack manager 638 can work together to configure the host computing devices 600 with the updated host firmware 606 and the updated BMC firmware 624.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer system, comprising:
   a host processor comprising a hardware interrupt pin;
   host firmware comprising an interrupt handler, wherein the interrupt handler comprises a plurality of sets of instructions that are executable by the host processor; and
   a baseboard management controller (BMC) that is connected to the hardware interrupt pin, wherein the BMC is configured to:
      generate an interrupt signal on the hardware interrupt pin in response to occurrence of a triggering event; and
      provide the host processor with context information, wherein the context information directs the host processor to identify a set of instructions in the host firmware that the host processor should execute in response to the interrupt signal.

2. The computer system of claim 1, wherein:
   the BMC is additionally configured to detect the occurrence of the triggering event; and
   the BMC generates the interrupt signal and provides the host processor with the context information in response to detecting the occurrence of the triggering event.

3. The computer system of claim 1, wherein the interrupt handler is configured so that:
   the host processor executes the set of instructions identified by the context information in response to the interrupt signal; and
   the host processor does not execute other sets of instructions in the interrupt handler in response to the interrupt signal.

4. The computer system of claim 1, wherein the host processor obtains the context information via an input/output read instruction that is native to the host processor.

5. The computer system of claim 1, wherein:
   the BMC further comprises BMC firmware; and
   the BMC firmware defines the context information and a triggering event for each of the plurality of sets of instructions in the interrupt handler.

6. The computer system of claim 1, wherein the BMC firmware is configured so that in response to occurrence of a triggering event, execution of the BMC firmware by the BMC processor causes the context information that is associated with the triggering event to be provided to the host processor.

7. The computer system of claim 1, wherein providing the host processor with the context information comprises writing the context information to a memory location that is shared by the BMC and the host processor and that is accessible via a data communication interface.

8. The computer system of claim 1, wherein providing the host processor with the context information comprises writing the context information to a memory location that is native to the host processor and that is accessible to the BMC via a data communication interface.

9. The computer system of claim 1, wherein the BMC is additionally configured to provide a code segment to the host processor along with the context information.

10. The computer system of claim 1, wherein:
    each of the plurality of sets of instructions in the interrupt handler is associated with an identifier; and
    the context information comprises the identifier that is associated with the set of instructions that should be executed.

11. The computer system of claim 1, wherein:
    each of the plurality of sets of instructions in the interrupt handler is associated with an identifier; and
    each identifier that is associated with a particular set of instructions in the interrupt handler is associated with a triggering event in the BMC firmware.

12. A baseboard management controller (BMC), comprising:
    a connector that facilitates electronic communication between the BMC and a hardware interrupt pin of a host processor;
    a BMC processor;
    BMC firmware in electronic communication with the BMC processor, wherein the BMC firmware defines context information and triggering events for a plurality of sets of instructions that are included in an interrupt handler in host firmware, and wherein the BMC firmware comprises instructions that are executable by the BMC processor to:
       generate an interrupt signal on the hardware interrupt pin; and
       provide the context information that corresponds to a triggering event to the host processor, wherein the context information directs the host processor to identify a set of instructions in the host firmware that the host processor should execute in response to the interrupt signal.

13. The BMC of claim 12, wherein:
the BMC firmware further comprises additional instructions that are executable by the BMC processor to detect occurrence of the triggering event; and
the interrupt signal is generated and the context information is provided to the host processor in response to detecting the occurrence of the triggering event.

14. The BMC of claim 12, wherein providing the context information to the host processor comprises writing the context information to a memory location that is shared by the BMC and the host processor and that is accessible via a data communication interface.

15. The BMC of claim 12, wherein providing the context information to the host processor comprises writing the context information to a memory location that is native to the host processor and that is accessible to the BMC via a data communication interface.

16. The BMC of claim 12, wherein the BMC firmware comprises additional instructions that are executable by the BMC processor to provide a code segment to the host processor along with the context information.

17. The BMC of claim 12, wherein:
each of the plurality of sets of instructions in the interrupt handler is associated with an identifier; and
the context information comprises the identifier that is associated with the set of instructions that should be executed.

18. The BMC of claim 12, wherein:
each of the plurality of sets of instructions in the interrupt handler is associated with an identifier; and
each identifier that is associated with a particular set of instructions in the interrupt handler is associated with a triggering event in the BMC firmware.

19. A method, comprising:
providing host firmware that comprises an interrupt handler, wherein the interrupt handler comprises a plurality of sets of instructions corresponding to different functions that can be performed by a host processor in response to an interrupt signal on a hardware interrupt pin;
providing baseboard management controller (BMC) firmware that defines context information and triggering events for the interrupt handler, wherein the context information comprises different identifiers for different sets of instructions in the interrupt handler and directs the host processor to identify a set of instructions in the host firmware that the host processor should execute in response to the interrupt signal, and wherein the triggering events indicate when particular sets of instructions should be executed;
configuring a plurality of host computing devices with the host firmware and the BMC firmware;
providing updated host firmware that includes a modified plurality of sets of instructions in the interrupt handler;
providing updated BMC firmware that includes updated context information and updated triggering events for the modified plurality of sets of instructions; and
configuring the plurality of host computing devices with the updated host firmware and the updated BMC firmware.

20. The method of claim 19, wherein the modified plurality of sets of instructions comprises at least one of:
an additional set of instructions that is not included in the plurality of sets of instructions; or
a modified version of a set of instructions that is included in the plurality of sets of instructions.

* * * * *